United States Patent [19]
Whitman

[11] Patent Number: 6,030,564
[45] Date of Patent: Feb. 29, 2000

[54] PROCESS FOR PREPARING GREEN BODIES

[75] Inventor: David William Whitman, Sumneytown, Pa.

[73] Assignee: Rohm and Haas Company, Philadelphia, Pa.

[21] Appl. No.: 09/080,782

[22] Filed: May 18, 1998

Related U.S. Application Data

[60] Provisional application No. 60/050,851, Jun. 26, 1997.

[51] Int. Cl.$^7$ .................................................. C04B 35/634
[52] U.S. Cl. .......................... 264/109; 524/401; 524/404; 524/413; 524/427; 524/424; 524/428; 524/435; 524/439; 264/670; 419/37; 419/65
[58] Field of Search ..................................... 264/670, 109; 524/430, 413, 401, 404, 427, 424, 428, 435, 439; 419/37, 65

[56] References Cited

U.S. PATENT DOCUMENTS

| | | | |
|---|---|---|---|
| 3,988,405 | 10/1976 | Smith | 264/670 |
| 4,836,966 | 6/1989 | Shimuzu et al. | 264/670 |
| 4,968,460 | 11/1990 | Thompson et al. | 264/6 |
| 5,401,695 | 3/1995 | Wu . | |

FOREIGN PATENT DOCUMENTS

| 764616 | 3/1997 | United Kingdom . |
|---|---|---|

*Primary Examiner*—James Derrington

[57] ABSTRACT

The present invention provides a method of preparing semi-wet pressed green bodies having improved wet strength. The wet strength of the semi-wet pressed green bodies is increased by the addition of at least one polymeric binder having a molecular weight greater than 50,000 comprising, as polymerized units, at least 10 percent of one or more monoethylenically unsaturated acids, salts, or anhydrides, and further comprising at least one hydrophobe per polymeric chain on average. The present invention further provides semi-wet pressed green bodies, having improved wet strength, made from the above method.

In one embodiment, the polymeric binder increases the wet strength of ceramic green bodies. In another embodiment, the polymeric binder increases the wet strength of metallurgic green bodies. In another embodiment, the polymeric binder increases the wet strength of cermet green bodies.

6 Claims, No Drawings

PROCESS FOR PREPARING GREEN BODIES

This application claims the benefit of U.S. Provisional Application No. 60/050,851, filed Jun. 26, 1997.

The present invention relates to a process for preparing green bodies from particulate materials. More specifically, the present invention relates to a semi-wet pressing process for preparing green bodies using selected binders. Green bodies prepared using these selected binders have improved wet strength.

As used herein, the term "particulate materials" refers to ceramic materials, metallurgic materials, and combinations thereof.

In the manufacture of ceramic and metallurgic products, particulate materials in the form of a powder or paste are subjected to elevated pressures to produce what is known as a "green body," which is then sintered to form a final product. Methods for compacting, or subjecting the particulate materials to elevated pressures, to produce green bodies include pressing, extrusion, roll compaction and injection molding. Pressing methods include dry pressing, isostatic pressing and semi-wet pressing. Using these methods, green bodies can be prepared in various shapes and sizes.

Ceramic materials are often used to prepare lightweight, strong, thermally and chemically resistant products useful as chromatographic media, grinding aids, abrasives, catalysts, adsorbents, electronic components, construction components, refractory components, and machine components. Metallurgic materials are often used to prepare machine components, electrical components, and tools. Similar products can be prepared from combining ceramic materials with metallurgic materials to form what is known as a "cermet."

The properties of the green body generally affect the properties of the final product. For example, if the density of the green body (the "green density") is too low, the mechanical properties of the final product, such as hardness, will diminish. If the strength of the green body (the "green strength") is too low, it becomes difficult or impossible to process and handle the green body. Furthermore, when green bodies are formed from non-dry precursor materials (e.g. by semi-wet pressing), the green body passes through various stages of drying before sintering takes place. The strength of the green body during the initial stages (the "wet strength") also affects the processing of the final product. If the wet strength of the green body is too low, it becomes difficult for the green body to maintain it's shape and to be handled before sintering. Thus, it is desirable to provide green bodies with improved wet strength.

Methods for increasing the green strength of ceramic green bodies, using binders as a processing aid, are known in the art. For example, polyvinyl alcohol ("PVA") and poly(ethylene glycol) ("PEG") are known to increase the green strength of ceramic green bodies. These binders are somewhat effective at increasing the green strength of ceramic green bodies. However, PEG and PVA suffer from several drawbacks. PEG does not result in particularly good green strength and has poor wet strength. PVA results in acceptable green strength, but causes a lowering in green density and has poor wet strength.

Another commonly used binder is lignosulfonate. Lignosulfonates, also known as lignin sulfonates and sulfite lignins, generally provide sufficient green strength to enable handling of the green bodies. However, lignosulfonate suffers from other drawbacks. For example, when ceramic products are prepared using lignosulfonate, high levels of sulfurous by-products are liberated when the ceramic is fired. It is desirable to replace lignosulfonates with a binder which maintains or improves the performance while reducing or eliminating the harmful sulfurous by-products. Furthermore, lignosulfonates do not always impart sufficient wet strength to withstand normal handling during processing.

U.S. Pat. No. 5,401,695 to Wu discloses the use of polymeric binders, overcoming the disadvantages noted above, to improve the green strength of ceramic products formed by a dry-pressing process. Wu teaches the use of low molecular weight polymers comprising, as polymerized units, at least 20 percent by weight of one or more monoethylenically unsaturated acids or salts thereof. Although the invention disclosed by Wu results in improved green strength, Wu leaves the problem of improving the wet strength in green bodies unaddressed.

The present invention seeks to overcome the problems associated with the previously known methods. The present invention seeks to provide a process for preparing ceramic green bodies using polymeric additives which (1) provide good mold release during the pressing stage; (2) impart improved wet strength of the green body; (3) provide high green density to the green body; (4) burn-out cleanly in air, and (5) leave low burn out residuals in nitrogen.

In a first aspect of the present invention there is provided a method for preparing semi-wet pressed green bodies comprising:

(a) mixing
  (i) particulate material selected from ceramic materials, metallurgic materials, and combinations thereof, and
  (ii) at least one polymeric binder having a molecular weight of at least 50,000 comprising, as polymerized units, at least 10 percent by weight of one or more monoethylenically unsaturated acids, salts, or anhydrides thereof, said polymeric binder further comprising more than one hydrophobe, having a saturated or unsaturated alkyl chain of at least $C_6$, per polymeric chain on average to form a semi-wet powder; and (b) pressing said semi-wet powder to form a green body.

In a second aspect of the present invention there is provided a semi-wet pressed green body having improved wet strength made from the above described method.

Particulate materials suitable for the present invention include: (1) oxide, nitride and carbide ceramics (e.g., alumina, aluminum nitride, silica, silicon, silicon carbide, silicon nitride, sialon, zirconia, zirconium nitride, zirconium carbide, zirconium boride, titania, titanium nitride, titanium carbide, barium titanate, titanium boride, boron nitride, boron carbide, tungsten carbide, tungsten boride, tin oxide, ruthenium oxide, yttrium oxide, magnesium oxide, calcium oxide, and ceramic superconductors) and combinations thereof; (2) metals, and mixtures or alloys thereof (e.g., iron, nickel, copper, tungsten, titanium, stainless steel, bronze, and metal superconductors); and (3) combinations of ceramic and metallurgic materials. The morphology of the particulate material is not critical but is preferably approximately spherical.

The polymeric binders suitable for the present invention are polymers comprising, as polymerized units, at least 10 percent by weight of one or more monoethylenically unsaturated acids, salts, or anhydrides thereof. Monoethylenically unsaturated acids can be mono-acids, di-acids or polyacids and the acids may be carboxylic acids, sulphonic acids, phosphonic acids, salts or combinations thereof. Suitable monoethylenically unsaturated acids are, for example, acrylic acid, methacrylic acid, crotonic acid, vinylacetic acid and the alkali metal and ammonium salts thereof. Suitable monoethylenically unsaturated dicarboxylic acids and the anhydrides of the cis-dicarboxylic acids are, for example, maleic acid, maleic anhydride, 1,2,3,6-tetrahydrophthalic anhydride, 3,6-epoxy-1,2,3,6-tetrahydrophthalic anhydride, 5-norbornene-2,3-dicarboxylic anhydride, bicyclo[2.2.2]-5-octene-2,3-dicarboxylic anhydride, 3-methyl-1,2,6-tetrahydrophthalic anhydride, 2-methyl-1,3,6-tetrahydrophthalic anhydride, itaconic acid, mesaconic acid, fumaric acid, citraconic acid, 2-acrylamido-2-methylpropanesulfonic acid, allylsulfonic acid, allylphosphonic acid, allyloxybenzenesulfonic acid, 2-hydroxy-3-(2-propenyloxy) propanesulfonic acid, isopropenylphosphonic acid, vinylphosphonic acid, styrenesulfonic acid, vinylsulfonic acid and the alkali metal and ammonium salts thereof. Most preferably, the one or more monoethylenically unsaturated acids are acrylic acid, methacrylic acid or the alkali metal salts thereof. The one or more monoethylenically unsaturated acids represent at least about 10 percent by weight of the total monomer weight, preferably at least about 40 percent by weight of the total monomer weight.

The polymers of the present invention further comprise at least one hydrophobe per chain on average. The term "hydrophobe," as used herein, refers to saturated or unsaturated alkyl chains of at least $C_6$. For purposes of describing this invention, hydrophobes include (1) monomers that contain saturated or unsaturated alkyl chains of at least $C_6$; and (2) blocks of monomer that contain saturated or unsaturated alkyl chains of at least $C_6$. Preferred hydrophobes are at least $C_{12}$. The average number of hydrophobes per chain may be calculated by multiplying the molecular weight of the polymer by the percent of the hydrophobe in the polymer, then dividing this result by the molecular weight of the hydrophobe. For example, a polymer with molecular weight 750,000, containing 10% of a hydrophobic monomer of molecular weight 1234 would have an average of 61 hydrophobes per chain.

Suitable hydrophobes are, for example:

(1) Z—R where is a saturated or unsaturated alkyl chosen in the range of $C_6$–$C_{30}$, and Z is a polymerizable group such as (meth)acrylate styryl or vinyl;

(2) R—(EO)$_x$—Z where R is a saturated or unsaturated alkyl chosen in the range of $C_6$–$C_{30}$, Z is a polymerizable group such as (meth)acrylate, styryl or vinyl, and EO is $CH_2CH_2$—O;

(3) R—(PO)$_x$—Z where R is a saturated or unsaturated alkyl chosen in the range of $C_6$–$C_{30}$, Z is a polymerizable group such as (meth)acrylate, styryl or vinyl, and PO is $CHCH_3CH_2$—O; and (4) Blocks of hydrophobic monomers such as polyethylene, polypropylene, polypropylene oxide or similar materials which make a hydrophobic segment in the polymer chain.

In addition, the polymers of the present invention may contain, as polymerized units, one or more monoethylenically unsaturated acid-free monomers. Suitable monoethylenically unsaturated acid-free monomers include $C_1$–$C_4$ alkyl esters of acrylic or methacrylic acids such as methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate. Other monoethylenically unsaturated acid-free monomers are acrylamides and alkyl-substituted acrylamides including acrylamide, methacrylamide, N-tertiarybutylacrylamide, N-methylacrylamide, and N,N-dimethylacrylamide. Other examples of monoethylenically unsaturated acid-free monomers include acrylonitrile, methacrylonitrile, allyl alcohol, phosphoethyl methacrylate, 2-vinylpyridene, 4-vinylpyridene, N-vinylpyrrolidone, N-vinylformamide, N-vinylimidazole, vinyl acetate, and styrene. If used, the one or more monoethylenically unsaturated acid-free monomers represent less than about 80 percent by weight of the total monomer weight, preferably less than about 70 percent by weight of the total monomer weight.

If desired, it is possible to incorporate polyethylenically unsaturated compounds into the polymerization. Polyethylenically unsaturated compounds function as crosslinking agents and will result in the formation of higher molecular weight polymers.

The polymers useful in the present invention preferably have a weight average molecular weight ("Mw") of at least about 50,000, more preferably greater than about 100,000, and most preferably greater than 150,000. At molecular weights below about 50,000, the polymers do not generally perform well as a wet strength binders. The molecular weights mentioned herein are measured by gel permeation chromatography.

Polymers having Mw above about 50,000 are generally considered high molecular weight polymers. Several techniques for preparing high molecular weight polymers are known to those skilled in the art. The polymer may formed by, for example, emulsion polymerization, solution polymerization, bulk polymerization, and suspension polymerization. Aspects of polymerization such as the selection and levels of initiators, processing conditions (temperature, pressure, feed rates, stirring), pH and the like are known to persons with ordinary skill in the art.

To obtain a polymer which contains, as polymerized units, from 2 percent to 50 percent of one or more monoethylenically unsaturated acids, emulsion polymerization is the preferred method. Optional additives may be present in the emulsion, such as, for example, lubricants or sintering aids.

The polymers useful in the present invention are generally prepared at a polymers solids level of from about 20 percent to about 70 percent, most preferably from about 25 percent to about 65 percent by weight based on the total weight of the emulsion. The polymers may be used in solid form but are most preferably used in an aqueous emulsion or solution.

The one or more particulate materials and the one or more polymeric binders of the present invention are mixed by any conventional means, such as by ball milling or mechanical mixing, to form a mixture. A typical formulation is about 0.1 to about 10 percent binder, from about 1 to about 15 percent water (or other solvent), and about 90 percent particulate material. More preferably, a typical semi-wet formulation contains from about 0.25 to about 5 percent binder, from about 2 to about 10 percent water (or other solvent), and about ninety percent particulate material. Most preferably, a typical semi-wet formulation contains from about 0.5 to about 3 percent binder, from about 3 to about 7 percent water (or other solvent) and about 90 percent particulate material.

In addition, the mixture may contain one or more conventional processing aids or other conventional additives. Conventional processing aids and additives include, for example, other binders, plasticizers, dispersants, lubricants, sintering aids and foam suppressants. For example, water, poly(ethylene glycol) and alkyl alcohols are known plasticizers. If used, each of the one or more conventional processing aids or other conventional additives may be present at a level of up to about 15, preferably from about 0.1 to about 10 percent by weight based on the weight of the one or more ceramic particles.

To form a ceramic green body, the ceramic precursor mixture is formulated and compacted. Methods for compacting, or subjecting the ceramic materials to elevated pressures, to produce ceramic green bodies include pressing, extrusion, roll compaction and injection molding. Pressing methods include dry pressing, isostatic pressing and semi-wet pressing. Preferably the ceramic green body is formed from the ceramic mixture by pressing at room temperature at a pressure of at least about 0.3 metric tons per square centimeter.

Before the green bodies are milled, drilled, ground, cut or subjected to other conventional machining processes, it is desirable to condition the green bodies. Conditioning the green bodies may result in the removal of trace amounts of water, plasticizers or other additives. The green bodies may be conditioned by allowing them to stand at room temperature, but are preferably conditioned by subjecting them to an elevated temperature of from about 30° C. to about 300° C., more preferably from about 40° C. to about 200° C. Depending upon the temperature, the green bodies are generally conditioned for from about 5 minutes to about 5 days or more.

To form a final ceramic product, the green body is fired, or sintered. The preferred temperature and time needed to sinter a green body to form a final ceramic product is partly dependent upon the type of ceramic used to make the ceramic green body. In general, it is preferred to sinter the ceramic green body to make the final ceramic product by heating the ceramic green body to a temperature of at least about 800° C., most preferably from about 1,000° C. to about 2,000° C., preferably for from about 5 minutes to about 5 hours, most preferably for from about 10 minutes to about 60 minutes.

To use the polymeric binder of the present invention, it is generally preferred that the pH of the semi-wet powder be at least 8.5. If the pH is below 8.5, the polymeric binder might not dissolve or swell and the green strength and plasticity may not be acceptable for some applications. If the pH of the semi-wet powder when formed is below 8.5, the pH may be increased by the addition of organic or inorganic bases. For example, useful organic bases include 2-amino-2-methyl-1-propanol and other amines. Inorganic bases useful in obtaining the desired pH level for the present invention include ammonium hydroxide, sodium hydroxide, calcium hydroxide, barium hydroxide, and other hydroxides of alkaline metals.

Semi-Wet Powder Preparation

The semi-wet powders, used to form the green bodies analyzed in Table I, were prepared in the following manner:

100 grams of silicon carbide, having a particle size $\leq 10$ millimeters, were weighed into a beaker. An amount of binder material, sufficient to result in the desired binder weight percentage, was added to the silicon carbide and mixed with a spatula for one minute. An amount of water, sufficient to result in the desired water weight percentage, was then added to the silicon carbide/binder mixture and mixed with a spatula for three minutes. When semi-wet powders were made using the binders of the present invention, the pH of the semi-wet powder was adjusted to optimize the performance of the binder. The pH adjustments so made usually involved the addition of sufficient ammonium hydroxide or 2-amino-2methyl-1-propanol so that the pH of the resulting powder was above 8.5. The above mixture was then placed in a sealed plastic bag to equilibrate (usually over night).

Evaluation of Green Strength and Green Density

Three 30 gram samples of each semi-wet powder were measured out. Each 30 gram sample was placed into a cylindrical die having a diameter of 2.86 centimeters. The die was then placed on a Carver press and compressed for one second at 0.4 metric tons/square centimeter. Pressure was then released from the die and reapplied for three seconds at 1.0 metric tons/square centimeter to form a green body.

The wet strength of the ceramic green bodies was evaluated by measuring the wet tensile strength using a diametral compression test. Wet tensile strength is calculated by the following formula:

$$\sigma_F = \frac{2 \cdot p}{\pi (D)(L)}$$

where $\sigma_F$ is the tensile strength, p is the applied load at failure, D is the diameter of the sample and L is the thickness of the sample. Diametral compression tests were conducted to determine the applied load at failure using a Soiltest® G-900 Versa-loader equipped with a 50 pound electronic force gauge (available from Ametek) operated at a loading rate of 0.013 centimeters per minute until the sample fractured. The wet strength reported in the tables below are the average of at least three measurements reported in kPa.

The densities of the ceramic green bodies reported in the tables below are densities based on an average of four measurements. The green densities were calculated in the following manner:

$$\rho_{measured} = \text{mass/volume}$$

where $\rho_{measured}$ is wet density and is reported in the table below in units of grams per cubic centimeter ("g/cm$^3$").

The following polymers appearing in the table below were evaluated as binders for silicon carbide semi-wet powders made according to the above procedure. The polymers had the following compositions and properties:

Polymer A: poly(acrylic acid) having a weight average molecular weight of 3,500.

Polymer B: poly(acrylic acid) having a weight average molecular weight of 10,000.

Polymer C: poly(acrylic acid) having a weight average molecular weight of 50,000.

Polymer D: poly(acrylic acid) having a weight average molecular weight of 200,000.

Polymer E: copolymer of 34.5 percent by weight ethylhexylacrylate, 55 percent by weight methyl methacrylate, 2.5 percent by weight styrene, and 8 percent by weight methacrylic acid, having a weight average molecular weight of 78,000.

Polymer F: copolymer of 60 percent by weight ethylacrylate, 40 percent by weight methacrylic acid, and 0.22 percent by weight diallylpthalate having a weight average molecular weight greater than 1,000,000.

Polymer G: copolymer of 35 percent by weight ethylacrylate, and 65 percent by weight methacrylic acid having a weight average molecular weight greater than 1,000,000.

Polymer H: copolymer of 50 percent weight ethylacrylate, 17 percent by weight methyl methacrylate, and 33 percent by weight methacrylic acid having a weight average molecular weight greater than 1,000,000.

Polymer I: copolymer of 50 percent by weight ethylacrylate, 45 percent by weight methacrylic acid, 3.75 percent by weight of a hydrophobe of the structure $CH_2 = C(CH_3)(CO_2) - (CH_2CH_2O)_{20} - R$, where R is a $C_{16}$–$C_{18}$ linear hydrophobe, and 1.25 percent by weight of a hydrophobe of the structure $CH_2 = C(CH_3)(CO_2) - (CH_2CH_2O)_{23} - R$, where R is a $C_{12}$–$C_{14}$ linear hydrophobe having a weight average molecular weight of 600,000.

Polymer J: copolymer of 50 percent by weight ethylacrylate, 40 percent by weight methacrylic acid, and 10 percent by weight of a hydrophobe of the structure $CH_2 = C(CH_3)(CO_2) - (CH_2CH_2O)_{20} - R$, where R is a $C_{16}$–$C_{18}$ linear hydrophobe having a weight average molecular weight of 750,000.

Polymer K: copolymer of 45 percent by weight ethylacrylate, 40 percent by weight methacrylic acid, 15 percent by weight of a hydrophobe of the structure $CH_2 = C(CH_3)(CO_2) - (CH_2CH_2O)_{23} - R$, where R is a $C_{12}$–$C_{14}$ linear hydrophobe, and 0.8 percent by weight n-dodecylmercaptan having a molecular weight of 61,300.

Polymer L: copolymer of 58 percent by weight ethylacrylate, 40 percent by weight methacrylic acid, 2 percent by weight of a hydrophobe of the structure

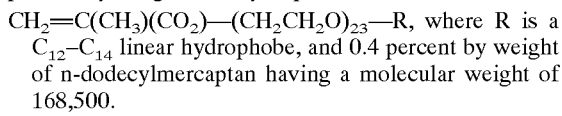

$CH_2=C(CH_3)(CO_2)—(CH_2CH_2O)_{23}—R$, where R is a $C_{12}$–$C_{14}$ linear hydrophobe, and 0.4 percent by weight of n-dodecylmercaptan having a molecular weight of 168,500.

Polymer M: copolymer of 58 percent by weight ethylacrylate, 40 percent by weight methacrylic acid, and 2 percent by weight of a hydrophobe of the structure

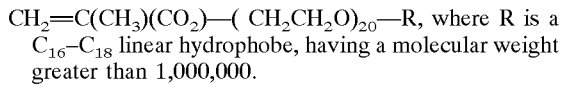

$CH_2=C(CH_3)(CO_2)—(CH_2CH_2O)_{20}—R$, where R is a $C_{16}$–$C_{18}$ linear hydrophobe, having a molecular weight greater than 1,000,000.

Polymer N: copolymer of 50 percent by weight ethylacrylate, 40 percent by weight methacrylic acid, 10 percent by weight of a hydrophobe of the structure

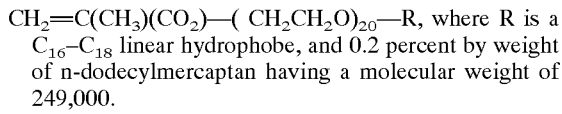

$CH_2=C(CH_3)(CO_2)—(CH_2CH_2O)_{20}—R$, where R is a $C_{16}$–$C_{18}$ linear hydrophobe, and 0.2 percent by weight of n-dodecylmercaptan having a molecular weight of 249,000.

higher than Wu's preferred range. While density is good, wet strength is lower than in samples 1–3.

Samples 10–12 illustrate the performance of a binder as disclosed by Wu, but with molecular weight higher than in samples 7–9. Density of these samples is good, but wet strength is again lower than in samples 1–3.

Samples 4–12 illustrate that increasing the molecular weight of binders as disclosed by Wu is not sufficient to fulfill the goal of increasing the wet strength of bodies pressed from semi-wet mixtures.

Samples 16–18 illustrate the performance of binders with composition as disclosed by Wu, but with extremely high molecular weight. The molecular weights of these three polymers are too high for accurate measurement, but it is believed that their relative molecular weights increase in the order I<H<G. The wet strength of these samples increase in the same order, suggesting that at sufficiently high molecular weight, further increase in molecular weight can improve wet strength. However, these binders still do not fulfill the goal of increasing the wet strength of bodies pressed from semi-wet mixtures.

Samples 13–15 illustrate the performance of binders with molecular weight in the range of the present invention and

TABLE I

| SAMPLE | POLYMER | POLYMER (%) | WATER (%) | WET STRENGTH (kPa) | DENSITY (g/ml) |
|---|---|---|---|---|---|
| 1 | A | 1 | 3.4 | 17.4 ± 1.6 | 2.32 ± 0.01 |
| 2 | A | 1 | 5.4 | 21.0 ± 0.7 | 2.37 ± 0.00 |
| 3 | A | 1 | 7.4 | 17.3 ± 1.7 | 2.35 ± 0.02 |
| 4 | B | 1 | 3 | 9.6 ± 0.9 | 2.42 ± 0.02 |
| 5 | B | 1 | 5 | 9.3 ± 0.3 | 2.38 ± 0.01 |
| 6 | B | 1 | 7 | 4.1 ± 0.08 | 2.44 ± 0.02 |
| 7 | C | 1 | 3.1 | 9.0 ± 0.9 | 2.42 ± 0.01 |
| 8 | C | 1 | 5 | 8.2 ± 0.3 | 2.43 ± 0.00 |
| 9 | C | 1 | 7 | 8.5 ± 0.6 | 2.42 ± 0.02 |
| 10 | D | 1 | 3 | 9.5 ± 1.3 | 2.39 ± 0.02 |
| 11 | D | 1 | 5 | 8.7 ± 0.8 | 2.46 ± 0.01 |
| 12 | D | 1 | 7 | 11.1 ± 1.6 | 2.41 ± 0.02 |
| 13 | E | 1 | 3.4 | 5.4 ± 0.9 | 2.41 ± 0.02 |
| 14 | E | 1 | 5.4 | 6.0 ± 0.6 | 2.41 ± 0.01 |
| 15 | E | 1 | 7.4 | 6.0 ± 0.1 | 2.38 ± 0.01 |
| 16 | F | 1 | 5 | 19.7 ± 1.0 | 2.45 ± 0.01 |
| 17 | G | 1 | 5 | 19.3 ± 0.3 | 2.41 ± 0.00 |
| 18 | H | 1 | 5 | 7.3 ± 0.6 | 2.43 ± 0.01 |
| 19 | I | 1 | 5 | 15.2 ± 1.1 | 2.43 ± 0.00 |
| 20 | J | 0.14 | 3 | 9.6 ± 0.6 | 2.42 ± 0.02 |
| 21 | J | 0.23 | 5 | 14.8 ± 1.1 | 2.45 ± 0.01 |
| 22 | J | 0.32 | 7 | 29.3 ± 1.0 | 2.42 ± 0.02 |
| 23 | J | 0.36 | 3 | 14.6 ± 0.8 | 2.39 ± 0.01 |
| 24 | J | 0.60 | 5 | 27.3 ± 1.7 | 2.43 ± 0.00 |
| 25 | J | 0.85 | 7 | 45.9 ± 3.2 | 2.41 ± 0.01 |
| 26 | J | 1 | 3 | 21.7 ± 1.9 | 2.41 ± 0.01 |
| 27 | J | 1 | 5 | 35.8 ± 2.2 | 2.42 ± 0.01 |
| 28 | J | 1 | 7 | 51.6 ± 1.5 | 2.39 ± 0.01 |
| 29 | K | 1 | 5 | 7.9 ± 0.3 | 2.45 ± 0.01 |
| 30 | L | 1 | 5 | 4.8 ± 0.003 | 2.43 ± 0.01 |
| 31 | M | 1 | 5 | 16.7 ± 1.0 | 2.40 ± 0.02 |
| 32 | N | 1 | 5 | 25.3 ± 2.3 | 2.41 ± 0.01 |

Samples 1–3 illustrate the performance of green bodies prepared using a binder as disclosed by Wu in U.S. Pat. No. 5,401,695 at column 6, lines 37 to 66, in the preferred molecular weight range as described in column 4, lines 1–7. While the density of the resulting bodies is good, wet strength is unacceptably low.

Samples 4–6 illustrate the performance of green bodies prepared using a binder as disclosed by Wu with the molecular weight higher than that in samples 1–3, but still within Wu's preferred range. Density of the resulting bodies was good, but wet strength is lower than in samples 1–3.

Samples 7–9 illustrate the performance of a binder with a composition as disclosed by Wu, but with molecular weight including at least one hydrophobe per chain, but having less than 10% of a monoethylenically unsaturated acid. Density of the resulting pressed bodies is good, but wet strength is poor.

Samples 19–28 illustrate the performance of binders as disclosed in the present invention. Density values for these samples remain in the desired range, while wet strength is increased, in most cases dramatically.

Samples 29–32 explore the relationship between molecular weight and hydrophobe content on wet strength and density in green bodies. While the samples presented do not represent optimized formulations for the respective binder compositions, it is believed that the relative performance of the binders would be similar upon optimization.

I claim:

1. A method for preparing semi-wet pressed green bodies having improved wet strength which comprises
   (a) mixing
      (i) particulate material selected from ceramic materials, metallurgic materials, and combinations thereof, and
      (ii) at least one polymeric binder having a weight average molecular weight of at least 50,000 comprising, as polymerized units, at least 10 percent by weight of one or more monoethylenically unsaturated acids, salts, or anhydrides thereof, said polymeric binder further comprising more than one hydrophobe, having a saturated or unsaturated alkyl chain of at least $C_{12}$ per polymeric chain on average to form a semi-wet powder; and
   (b) pressing said semi-wet powder to form a green body.

2. The method of claim 1 further comprising mixing one or more organic or inorganic bases with the particulate material and polymeric binder to form a semi-wet powder.

3. The method of claim 1, wherein the particulate material is selected from alumina, aluminum nitride, silica, silicon, silicon carbide, silicon nitride, sialon, zirconia, zirconium nitride, zirconium carbide, zirconium boride, titania, titanium nitride, titanium carbide, barium titantate, titanium boride, boron nitride, boron carbide, tungsten carbide, tungsten boride, tin oxide, ruthenium oxide, yttrium oxide, magnesium oxide, calcium oxide, ceramic superconductors, carbon, iron, nickel, copper, tungsten, titanium, metal superconductors, or combinations thereof.

4. The method of claim 1, wherein the one or more monoethylenically unsaturated acids, salts or anhydrides thereof are selected from monoethylenically unsaturated carboxylic acids, sulphonic acids, phosphonic acids, salts or anhydrides thereof.

5. The method of claim 1, wherein the polymeric binder has a weight average molecular weight of at least 100,000.

6. The method of claim 1, wherein the polymeric binder has a weight average molecular weight of at least 500,000.

* * * * *